Feb. 17, 1970
J. W. YATES
3,495,402
POWER SYSTEM
Filed Jan. 18, 1968
4 Sheets-Sheet 1
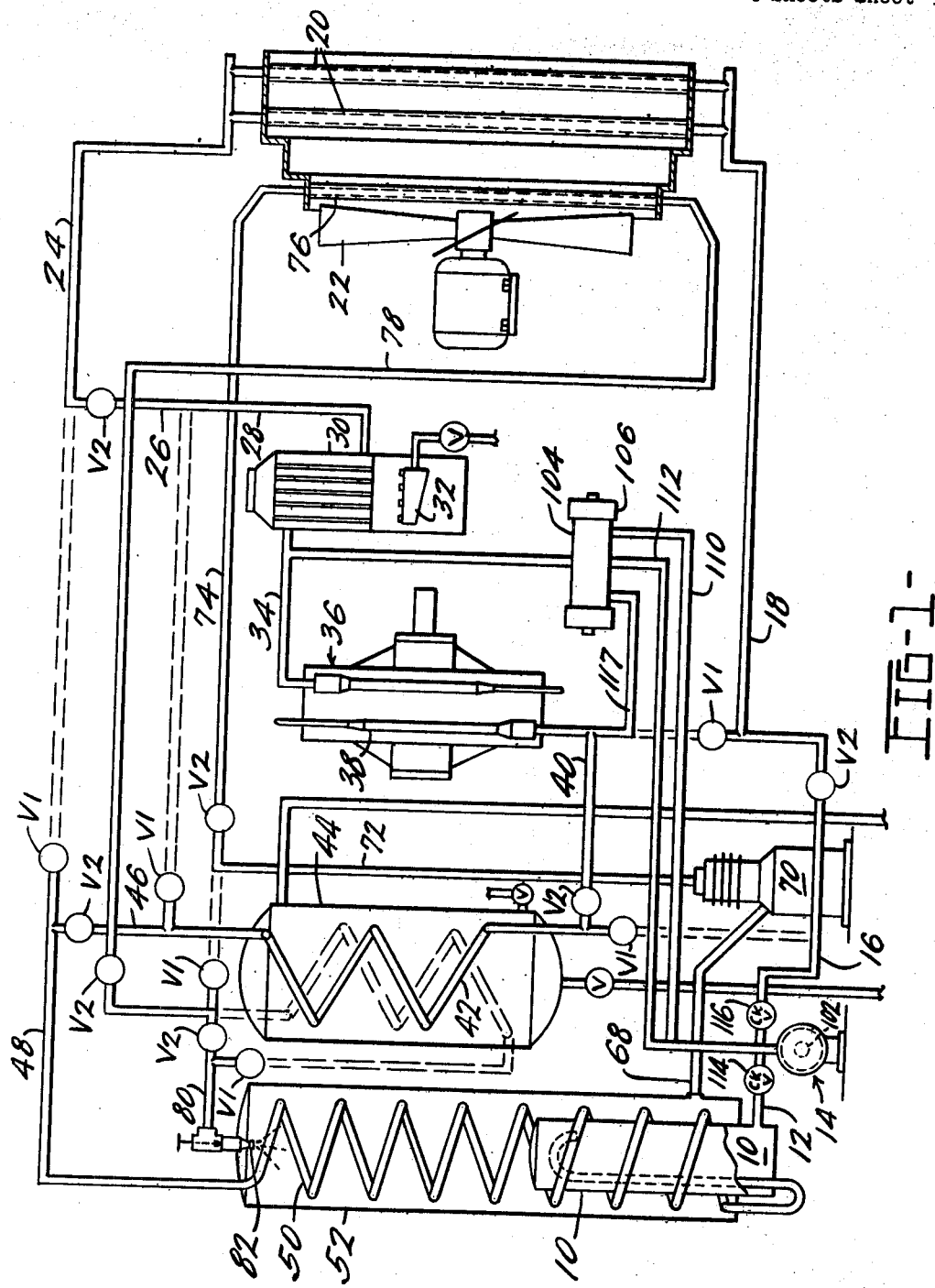
FIG-1-
INVENTOR:
JOHN W. YATES.
BY
Owen + Owen
ATT'YS.

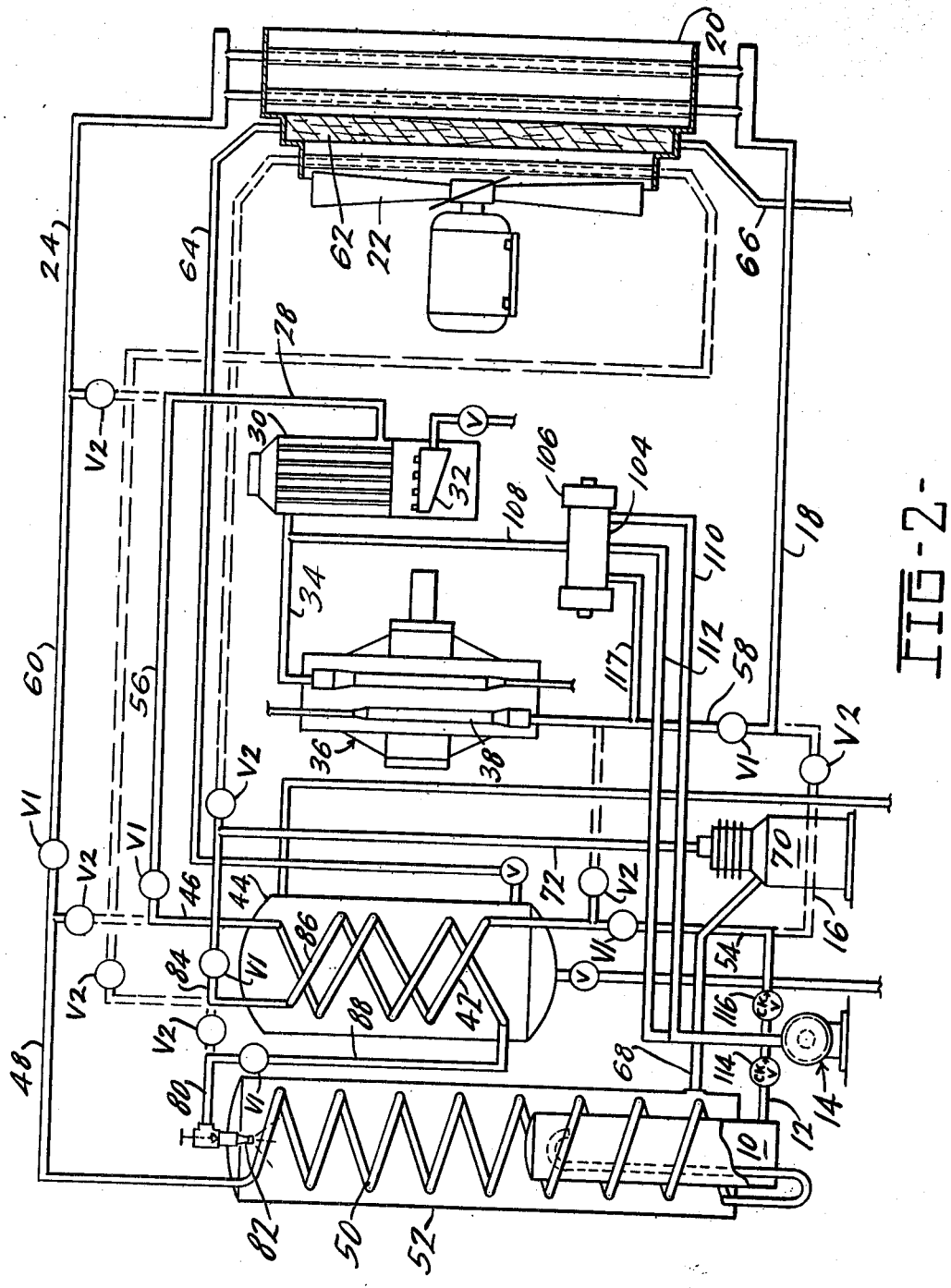

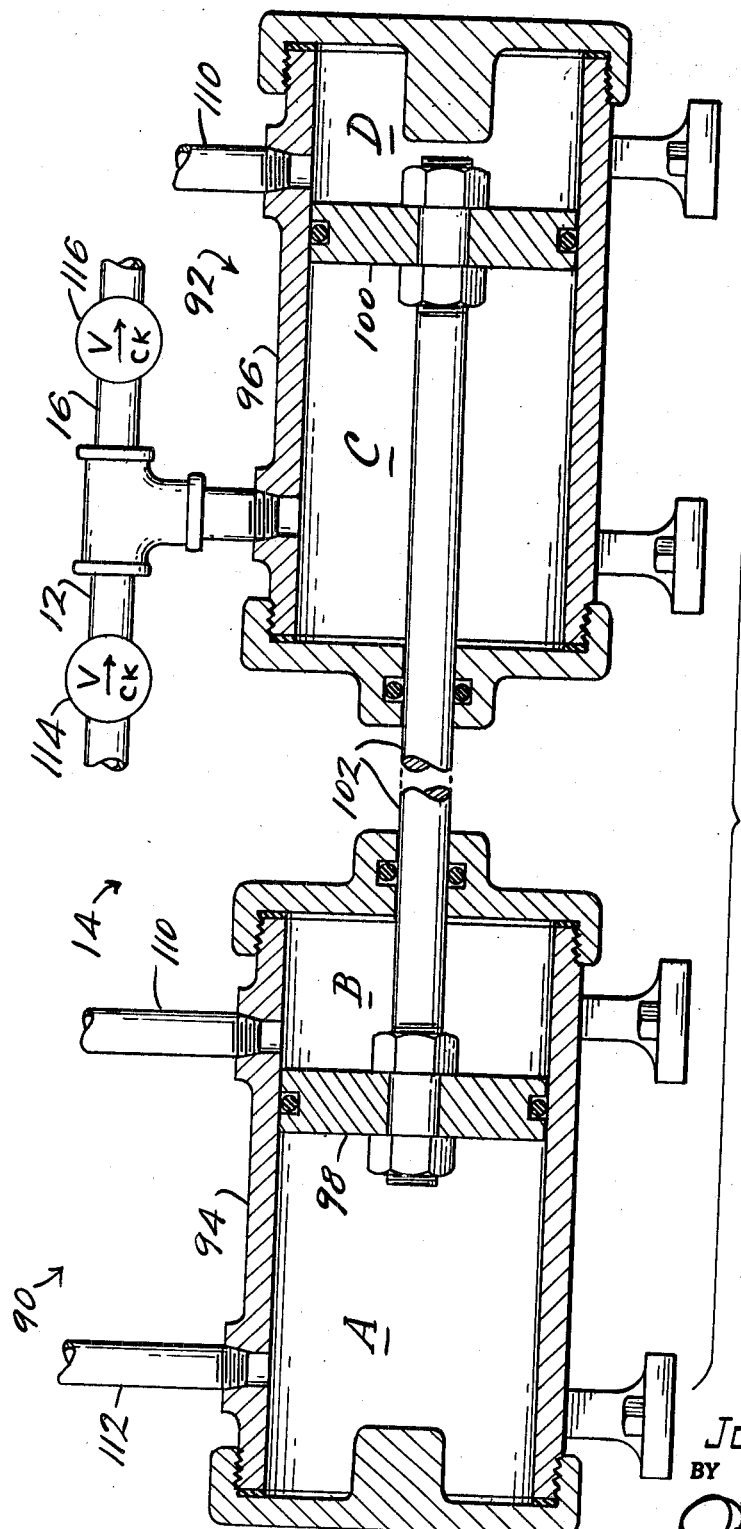

Feb. 17, 1970   J. W. YATES   3,495,402
POWER SYSTEM
Filed Jan. 18, 1968   4 Sheets-Sheet 4
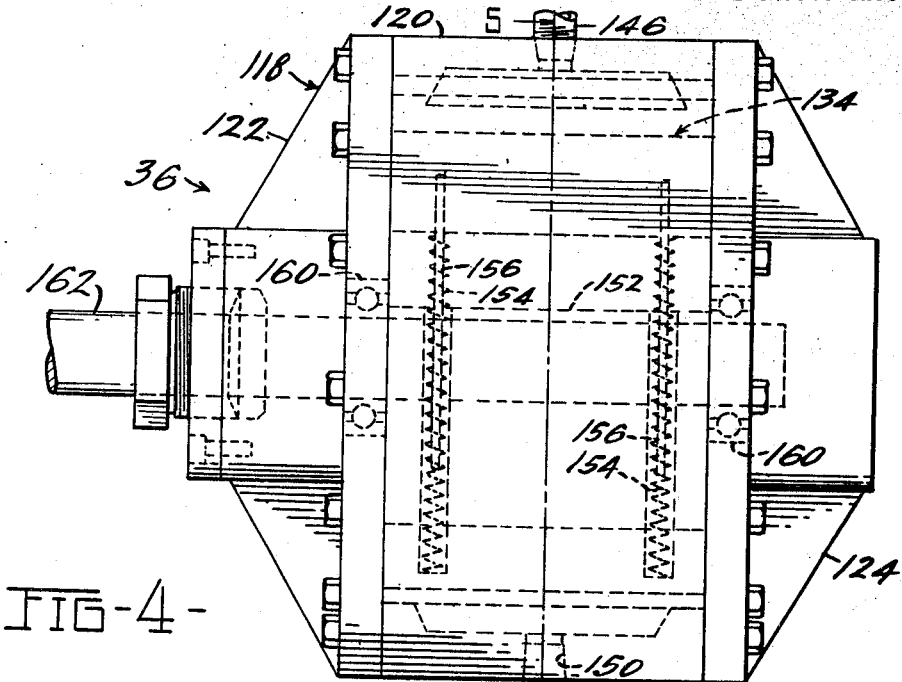
FIG-4-
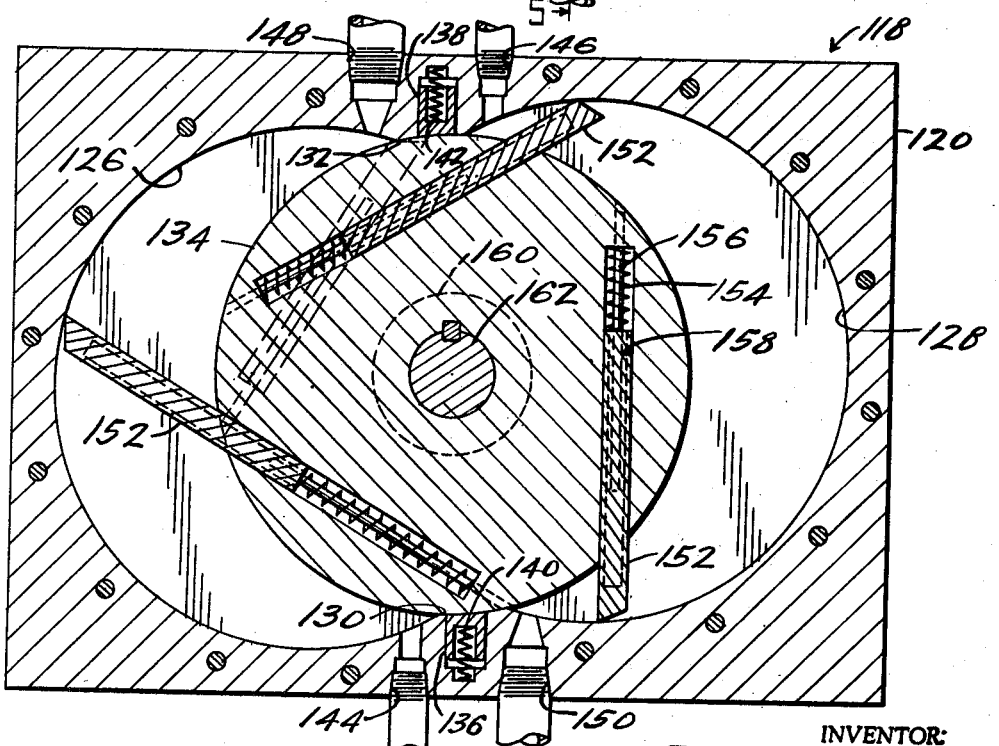
FIG-5-
INVENTOR:
JOHN W. YATES.
BY
Owen & Owen
ATT'YS.

United States Patent Office 3,495,402
Patented Feb. 17, 1970

3,495,402
POWER SYSTEM
John W. Yates, 6005 6th St., Tampa, Fla. 33611
Filed Jan. 18, 1968, Ser. No. 698,955
Int. Cl. F01k 25/06, 21/04, 3/18
U.S. Cl. 60—36
9 Claims

ABSTRACT OF THE DISCLOSURE

A power system utilizes a temperature differential between an available supply of water and an available supply of air to condition a propellant so as to enable it to drive a particular prime mover. In the event the temperature differential between the available water and air is insufficient, a secondary system can be employed to produce the proper conditions for the propellant. In a preferred form, a refrigerant is used as the propellant and a refrigerant can also be used in the secondary system when such is required. The power system also includes a unique pump for the propellant and a unique rotary motor as the prime mover for converting the energy of the propellant into mechanical energy.

---

This invention relates to a power system and to certain components thereof.

A power system embodying the invention has a number of advantages. The system can be designed in a large range of sizes, small enough to propel model vehicles and large enough for use in large electric plants. The power system eliminates the danger of atomic fission and also smog, soot, carbon dioxide and other noxious elements.

The power system uses a fast expanding propellant such as certain refrigerants which can take advantage of a relatively small temperature differential between available water and available air to achieve a proper state in which the propellant can be used to drive a prime mover such as a rotary motor. The rotary motor itself is of a unique design, operating on the positive displacement principle with a low input and exhaust pressure differential. The motor also can be operated at low or high speeds and is employed in a closed system without loss of the propellant. The power system also includes a secondary system for supplementing the effect of the temperature differential of the air and water, when necessary. The system further employs a unique fluid pump that operates and is governed by the pressures of the propellant in the primary system.

It is, therefore, a principal object of the invention to provide an improved power system having a number of advantages over those heretobefore known.

Another object of the invention is to provide an improved rotary motor and fluid pump for a power system.

Many other objects and advantages of the invention will be apparent from the following detailed description of a preferred embodiment thereof, reference being made to the accompanying drawings, in which:

FIG. 1 is a diagrammatic view of a power system embodying the invention, shown operating under certain conditions;

FIG. 2 is a diagrammatic view similar to FIG. 1 showing the system operating under certain other conditions;

FIG. 3 is a somewhat schematic, longitudinal sectional view of a fluid pump embodied in the power system;

FIG. 4 is a side view in elevation of a rotary motor employed in the power system; and FIG. 5 is a somewhat schematic view in cross section taken along the line 5—5 of FIG. 4.

The power system embodying the invention is operated under one set of conditions in FIG. 1 and another set in FIG. 2. In FIG. 1, the system is operated under conditions where ambient temperature of available air exceeds that of available water, whereas in FIG. 2, the system is shown operated where the temperature of available water exceeds the ambient temperature of available air. In either case, the system can be operated to produce usable power where the air-water temperature differential exceeds about 10° F. Where the differential is smaller or the output requirements are larger, a secondary heat transfer system is employed to supplement the natural temperature differential of air and water. Further, heat can be added to the propellant in the primary system, if needed. In any case, heat is added to the propellant prior to the propellant being employed to drive a motor to convert part of the energy of the propellant to mechanical energy, and the exhausted propellant is subsequently cooled before being re-cycled.

The system can best be explained with the use of particular examples which are utilized for purposes of illustration and not limitation. Referring to FIG. 1, conditions are assumed to exist in which a 10° F. differential exists between air and water, with air at 84° F. and water at 74° F. Under these conditions, the system is operated with all even-numbered valves designated V2 being opened and all odd-numbered valves designated V1 closed. The system will further be explained with the propellant employed being Freon 22. The propellant exists in a receiver 10 in a temperature of 40° F. and a pressure of 68 p.s.i.g. The propellant is withdrawn from the receiver through a line 12 and compressed by a fluid transfer pump 14, which will be discussed in detail subsequently. The propellant is then pumped through lines 16 and 18 and a coil 20 over which ambient air is passed by means of a fan or blower 22. The propellant then passes through lines 24, 26, and 28 to a coil 30 in which additional heat can be added, if desired, by an energy source 32 shown as a fuel burner. The propellant then is supplied through a line 34 at a temperature of 100° F. and pressure of 196 p.s.i.g. to a rotary motor 36. Here, the propellant gives up part of its accumulated energy in the form of mechanical energy acting on the face of rotor blades therein, to be discussed subsequently. The expanded propellant, at 80° F. and 143 p.s.i.g., is exhausted from the motor through a line 38 where it is directed through a line 40 to a water-cooled coil 42 in a suitable tank or receptacle 44. After passing through the coil 42, the propellant is at 76° F. and 134 p.s.i.g., when water at a temperature of 74° F. is used in the tank 44. The propellant then is directed through lines 46 and 48 and through a coil 50 in a refrigerant tank 52 after which the propellant is directed once again into the receiver 10.

When water is used as the heat source and air as the cooling source, the even-numbered valves in the primary system are closed and the odd-numbered valves are opened. Referring to FIG. 2, and with 74° F. water and 64° F. air, liquid propellant at 40° F. and 68 p.s.i.g. is again withdrawn from the receiver or storage tank 10 by the pump 14 but, in this instance, is fed through a line 54 to the coil 42 in the tank 44 which contains the 74° F. water. The propellant is supplied through a line 56 to the coil 30 and then to the motor 36, entering the motor at 94° F. and 179 p.s.i.g. The exhausted propellant, at 74° F. and 130 p.s.i.g., is then directed through the exhaust line 38 and a line 58 to the primary coil 20 past which is directed the air at 64° F. The propellant is then directed through a line 60 and the line 48 and through the coil 50, after which the propellant is directed once again into the receiver 10.

The cooling effect of the air can be further enhanced by an absorbent pad 62 located in front of the coil 20 with water from the tank 44 supplied to the pad through a line 64 and drained through a line 66. The air passes through the moist pad to be further cooled and thereby have an increased cooling effect on the coil 20. This enables effective heating and cooling to be achieved between the water and air even though the temperature differential is small.

When the temperature differential of the air and water is not sufficient or where the system is used to power a vehicle, for example, a secondary system is used to supplement the temperature differential of the primary system. With the situation in FIG. 1, where the air is warmer than the water, all of the even-numbered valves in the secondary system are open. This system employs a propellant which is preferably more slowly expanding than that in the primary system, such as Freon 11. As shown, a propellant in the refrigerant tank 52 is fed through a line 68 to a compressor 70. The refrigerant, at a temperature of 40° F. and a pressure of 7 p.s.i.g., is compressed to 150° F. at 53 p.s.i.g. It is then supplied through lines 72 and 74 to a secondary air coil 76 in front of the coil 20. The refrigerant heats the air before it contacts the coil 20 to greatly increase the heating effect on the propellant in the primary system. The refrigerant leaves the coil 76 at 100° F. and 24 p.s.i.g. and is directed through lines 78 and 80 to a spray nozzle 82 through which it expands into the low pressure cooling tank 52 where it is ready to be re-cycled.

The secondary system also can be employed in the situation of FIG. 2 wherein the water serves as the heat source and the air as the cooling source. The refrigerant again is withdrawn from the tank 52 through the line 68 by the compressor 70. In this instance, the refrigerant passes through the line 72 and line 84 to a secondary coil 86 in the water tank 44 where it further heats the water and the propellant in the coil 42 of the primary system. The refrigerant then passes through a line 88 and the line 80 to the nozzle 82 where it is sprayed over the coil 50 in the tank 52 and is then ready for re-cycling.

The particular design of the fluid transfer pump 14 substantially increases the efficiency of the overall system. The pump is driven by the propellant on the high pressure side of the rotary motor 36 with the propellant discharged to the low pressure side of the motor. As shown in FIG. 3, the pump 14 has two units 90 and 92, which include cylinders 94 and 96 and pistons 98 and 100 connected by a common push rod 102. The pistons separate the cylinders 94 and 96 into chambers designated A, B, C, and D. Flow of fluids to the four chambers is regulated through a four-way valve 104, the valve spool of which can be controlled through an electromagnetic coil 106 which can be energized periodically by any suitable timing means.

As shown in FIGS. 1 and 2, the high pressure propellent is supplied to the four-way valve through a line 108 which connects with the line 34 upstream of the motor. The high pressure propellant is supplied through lines 110 and 112 to the units 90 and 92 with the line 110 communicating with both chambers B and D and with the line 112 communicating with the chamber A. The chamber C connects with the lines 12 and 16 through check valves 114 and 116, drawing fluid into the chamber C from the line 12 when the pistons move toward the right, as shown in FIG. 3, and compressing and forcing the propellant through the line 16 when the pistons move toward the left. The pressure in chamber A serves to move the pistons toward the right and draw the propellant into the chamber C while the pressure in both chambers B and D forces the piston toward the left to compress the propellant. The valve 104 exhausts the propellant from the chambers A, B, and D through a line 117 and to the line 58 on the low pressure side of the rotary motor.

The pump operates effectively at both low and high pressures. By way of illustration, assuming that the cylinders are eight inches in dameter and that the connecting rod has a two inch diameter, with the propellant from the line 34 being under a pressure of 25 p.s.i. and that in the line 58 being under a pressure of 10 p.s.i. then the force exerted in chambers B and D on the pistons to compress the liquid in chamber C will be equal to 2434 pounds, decreased by a force of 503 pounds in chamber A necessary to discharge the fluid in chamber A to the low pressure side and a frictional drag of 100 pounds. This provides a net force which is more than enough to compress the propellant in chamber C to 25 p.s.i. With higher pressures, an even greater differential can be attained so that the pump 14 is effective under all conditions.

The rotary motor 36 will now be discussed in detail with reference to FIGS. 4 and 5. The motor 36 is designed to operate on a positive displacement principle in a closed system and at both high and low speeds with only a small pressure differential of the propellant between the entrance and exhaust ports. The motor includes a housing 118 consisting of a central portion 120 and end caps 122 and 124. A pair of cavities 126 and 128 are formed in the housing portion 120 separated by short arcuate walls 130 and 132. As shown, the cavities 126 and 128 form segments of circles with the centers spaced apart and offset slightly vertically. A rotor 134 is centrally located between the cavities and is positioned in close proximity with the walls 130 and 132 so that the chambers 126 and 128 are separated. Abutment seals 136 and 138 bear against the periphery of the rotor 134 and are urged thereagainst by springs 140 and 142. Entrance openings 144 and 146 connect with the entrance manifold to supply the propellant under pressure to the cavities 126 and 128. Similarly, exhaust ports 148 and 150 communicate with the exhaust manifold and exhaust the propellant from the cavities. In this instance, three blades 152 are carried by the rotor 134 and are urged outwardly by spring 154 which are located around pins 156 extending axially into cavities 158 holding the blades.

The propellant entering the cavities 126 and 128 places a force against the blades 152 to cause clockwise rotation of the rotor 134. The rotor is rotatably held by bearings 160 in the end caps and is keyed to an output or power take-off shaft 162 from which the output of the system is utilized.

Various modifications of the above described embodiment of the invention will be apparent to those skilled in the art, and it is to be understood that such modifications can be made without departing from the scope of the invention, if they are within the spirit and the tenor of the accompanying claims.

I claim:

1. A closed system for producing power comprising a source of a propellant, means for compressing and adding heat to the propellant, a prime mover, means for supplying propellant to said prime mover, means for exhausting propellant from said prime mover, means for withdrawing heat from said propellant, means for directing the propellant back to said source, a source of air and a source of water, one of which is at a higher temperature than the other, said means for compressing and adding heat to said propellant before entering said prime mover including heat exchange means for supplying heat from the warmer one of said air and said water to said propellant, and said means for withdrawing heat from said propellant after leaving said prime mover including heat exchange means for supplying heat from said propellant to the cooler one of said air and said water.

2. A system according to claim 1 characterized further by an auxiliary heater for supplying additional heat to the propellant prior to entering said prime mover.

3. A closed system for producing power comprising a source of a propellant, means for compressing and adding heat to the propellant, a prime mover, means for supplying propellant to said prime mover, means for exhausting propellant from said prime mover, means for withdrawing heat from said propellant, means for directing the propellant back to said source, said means for compressing said propellant comprising cylinder and piston means forming two chambers, means for supplying propellant from said source to one chamber and for withdrawing compressed propellant from said one chamber to said heating means, means for supplying propellant to the other chamber from a point downstream of said heating means and upstream of said prime mover, and means for exhausting said heated propellant from said other chamber to a point downstream of said prime mover.

4. A closed system for producing power comprising a source of a propellant, means for compressing and adding heat to the propellant, a prime mover, means for supplying said propellant to said prime mover, means for exhausting propellant from said prime mover, means for withdrawing heat from said propellant, means for directing the propellant back to said source, said prime mover comprising housing means forming at least two adjacent, communicating cavities having arcuate outer extremities, a rotor, means rotatably supporting said rotor by said housing and extending into each of said cavities, a power take-off shaft extending from said rotor, a plurality of vanes carried by said rotor extending into said cavities, means for supplying heat and compressed propellant to said cavities, and means for exhausting the propellant from each of said cavities.

5. A system according to claim 4 further comprising sealing means carried by said housing and engaging the periphery of said rotor between said cavities.

6. A closed system for producing power comprising a source of a propellant, means for compressing and adding heat to the propellant, a prime mover, means for supplying propellant to said prime mover, means for exhausting said propellant from said prime mover, means for withdrawing heat from said propellant, means for directing the propellant back to said source, an additional, secondary system including a source of a refrigerant, means for compressing the refrigerant, means for supplying heat from said refrigerant to said propellant upstream of said prime mover, and means for returning said refrigerant to said source.

7. In a power system, a prime mover, a source of fluid, heating means, first passage means for directing fluid from said source to said heating means, second passage means for supplying fluid from said heating means to said prime mover, and third passage means for directing fluid from said prime mover back to said source, a pump associated with said first passage means for compressing and pumping fluid from said source to said heating means, said pump comprising a pair of cylinders, a first piston in one of said cylinders, a second piston in the other of said cylinders, a connecting rod connecting said pistons for causing simultaneous movement thereof, means for directing fluid from said source into a first chamber on one side of the first piston in said one cylinder and for directing the fluid from said first chamber through said first passage means in a compressed state to said heating means, means for directing heated fluid upstream of said prime mover into a second chamber in said one cylinder on the opposite side of said first piston and into third and fourth chambers formed in said other cylinder on each side of said second piston, and means for exhausting fluid from said second, third, and fourth chambers to said third passage means downstream of said prime mover.

8. A closed system for producing power comprising a source of propellant, means for supplying energy to said propellant, means for returning propellant to the source, and a prime mover between said supplying and returning means and comprising a housing, a pair of communicating cavities formed in said housing with arcuate outer extremities, a rotor rotatably supported in said housing and extending into both of said cavities, means for supplying the propellant to each of said cavities from opposite directions, means for exhausting propellant from both of said cavities in opposite directions to said return means, said rotor having a plurality of blades extending outwardly therefrom, means carried by said rotor for urging said blades outwardly into contact with said outer extremities of said cavities, and sealing means located generally diametrically opposite with respect to said rotor and carried by said housing to maintain said cavities in separate, gas-tight relationship.

9. A system according to claim 8 characterized by said urging means urging said blades in outward direction parallel to the planes of the blades.

References Cited
UNITED STATES PATENTS

| | | | |
|---|---|---|---|
| 1,440,000 | 12/1922 | Bonine | 60—49 XR |
| 1,874,620 | 8/1932 | Radford | 60—49 |
| 1,886,076 | 11/1932 | Abendroth et al. | 60—36 XR |
| 1,993,585 | 3/1935 | Baumann et al. | 60—49 XR |
| 2,379,700 | 7/1945 | Franck. | |
| 2,471,476 | 5/1949 | Benning et al. | 60—36 |
| 2,621,481 | 12/1952 | Bowden. | |
| 2,690,051 | 9/1954 | Peskin. | |
| 2,714,289 | 8/1955 | Hofmann. | |
| 3,252,286 | 5/1966 | Whitelaw. | |
| 3,303,646 | 2/1967 | Southam | 60—49 |
| 3,323,304 | 6/1967 | Llobet et al. | 60—267 XR |

MARTIN P. SCHWADRON, Primary Examiner

ROBERT R. BUNEVICH, Assistant Examiner

U.S. Cl. X.R.

60—49, 59